United States Patent [19]
Burke et al.

[11] 4,216,356
[45] Aug. 5, 1980

[54] TELEPHONE HAVING SEPARATE VOICE AND SIGNALING PAIRS

[75] Inventors: Edmund T. Burke, West Long Branch; David F. Jones, Middletown, both of N.J.

[73] Assignee: Bell Telephone Laboratories, Incorporated, Murray Hill, N.J.

[21] Appl. No.: 13,567

[22] Filed: Feb. 21, 1979

[51] Int. Cl.² ................................................. H04Q 5/18
[52] U.S. Cl. .............................. 179/99 LS; 179/84 A; 179/99 R
[58] Field of Search ................ 179/81 R, 84 A, 84 R, 179/99 R, 99 LS

[56] References Cited
U.S. PATENT DOCUMENTS

| | | | |
|---|---|---|---|
| 2,629,783 | 2/1953 | Hopkins | 179/81 |
| 3,322,903 | 5/1967 | Chapin | 179/84 L |
| 3,374,317 | 3/1968 | Chapin | 179/84 L |
| 3,453,396 | 7/1969 | Lacey et al. | 179/99 |
| 3,739,104 | 6/1973 | O'Neill | 179/99 LC |
| 3,920,902 | 11/1975 | Matsuo et al. | 179/99 A |
| 4,024,353 | 5/1977 | Hisikata | 179/99 LC |
| 4,046,972 | 9/1977 | Huizinga et al. | 179/99 M |
| 4,081,625 | 3/1978 | Hamatawi et al. | 179/99 LC |
| 4,125,749 | 11/1978 | Kinoshita | 179/99 M |

*Primary Examiner*—Gerald L. Brigance
*Attorney, Agent, or Firm*—David H. Tannenbaum; John A. Caccuro

[57] ABSTRACT

A telephone station set (S1) is arranged to communicate voice signals over a voice communication pair (V1) and to communicate ringing, switchhook supervision and visual signaling over a separate signaling pair (C1). An amplitude and polarity modulated alternating voltage on the signaling pair (C1) provides current flow in one direction for visual signaling while distinguishable amounts of current flow in the opposite direction to provide switchhook and ringing supervision. The switchhook supervision current and the ringing signal current both flow through a series connection of a buzzer (B1) and a break switchhook contact (SH2) in the telephone station set. An off-hook condition at the telephone interrupts current flow on the signaling pair (C1) providing a switchhook supervision signal while simultaneously terminating the ringing signal.

11 Claims, 4 Drawing Figures

TELEPHONE HAVING SEPARATE VOICE AND SIGNALING PAIRS

TECHNICAL FIELD

This invention relates to telephone station circuits and, more particularly, to a signaling circuit for use in such telephone station circuits.

BACKGROUND OF THE INVENTION

Telephone station sets are generally interconnected by two or more wires to either a central office or other exchange such as a private business exchange or local switching controller. With a common battery type system direct current is supplied by the central office or exchange to the telephone station set over a tip and ring pair. In addition, the tip and ring pair is normally used to carry voice communications, dialing, ringing signals and switchhook supervision between the telephone station set and central office or exchange. A typical telephone circuit arrangement used to provide these functions is shown in FIG. 2 of U.S. Pat. No. 2,629,783 issued to H. F. Hopkins on Feb. 24, 1953.

If a visual indicating capability is required on the telephone, an arrangement such as disclosed in U.S. Pat. No. 3,322,903 issued to D. M. Chapin on May 30, 1967 may be implemented. Other telephone arrangements such as the 500Y station set manufactured by Western Electric Company utilize three wires to connect the telephone station set to a central office or exchange. In the 500Y station set the tip and ring leads carry voice communications, dialing, switchhook supervision and visual signaling. The ringing signal for the 500Y station set is carried between the third wire and the ring lead.

To improve the longitudinal balance and quality of voice communications some modern telephone switching controllers require isolation of the voice communication path from the switchhook supervision, ringing and visual signaling path. However, it is also an objective in such applications to minimize the number of wire pairs needed to provide the various signaling requirements to the connected telephones.

In U.S. Pat. No. 3,453,396 issued on July 1, 1969 to J. C. Lacey et al, voice communications and ringing are provided on a tip and ring pair with supervision and visual indications being provided by a second pair. In Lacey the pickup key of a key telephone is used to provide a lamp current reversal for A lead signaling. The Lacey patent, however, does not provide for isolation of the voice communications from the switchhook supervision, ringing and visual signaling.

In U.S. Pat. No. 4,046,972 issued on Sept. 6, 1977 to D. D. Huizinga et al an electronic key telephone station set is described which communicates with a telephone controller using a data transmit pair and a data receive pair for data communications in addition to a tip and ring pair for voice communications. In Huizinga, digital data signals representative of the switchhook supervision, ringing, visual and other signals are sent over the data transmit and data receive pairs. Digital multiplex data signaling is utilized in Huizinga which enables multiple telephone line signaling over the data transmit and data receive pairs.

In applications involving existing telephone controllers (telephone systems), it may be desirable to utilize the signaling voltages available at the telephone controller to provide the switchhook supervision, ringing and visual signaling for telephone operation. In these applications a telephone station set is required which both utilizes the available signaling voltages from the telephone controllers, as well as maintaining the desired isolation of voice communication from the signaling voltages. Neither Huizinga nor the previously mentioned telephone station set prior art communicate voice signals over a first wire pair and communicate existing signaling voltages over a second wire pair.

Thus, one objective is to design a telephone station set which provides voice communications and dialing over one wire pair and switchhook supervision, ringing and visual signaling over a second wire pair.

Another objective is to utilize the existing signaling voltages available at the telephone switching controllers to provide the required signaling to the telephone station set.

A further objective is to minimize the modifications required to a standard telephone station set to perform the desired signaling functions.

DISCLOSURE OF THE INVENTION

The above-discussed problem is solved by the disclosed telephone station set. A standard telephone station set is modified to provide voice communication and dialing over a communication pair and switchhook supervision, ringing and visual signaling over a separate signaling pair. The supervision, ringing and visual signals are derived by amplitude and polarity modulating existing alternating voltages available at the telephone controller. An interface circuit for providing the desired signaling voltages from signals available at a key telephone system is the subject of our copending patent application E. T. Burke-D. F. Jones, Ser. No. 13566, filed concurrently herewith and incorporated by reference herein.

The station set is arranged to decode the modified alternating voltage signals and to provide audible and visual indications in response to these signals. The supervision or on-hook, off-hook status of the station set is determined by having the telephone controller monitor the current flow over the signaling pair to the station set.

A visual indicating device in the modified station set is arranged to illuminate only in response to a first direction of current flow over the signaling pair. A buzzer in the station set is arranged in series with a diode and rings only in response to a current flow opposite in direction to the first abovementioned current flow. A break contact of the switchhook is arranged in series with the buzzer to provide a switchhook supervision signal and to simultaneously extinguish ringing when the station set goes off hook. Supervision signals are encoded as an interruption of the current flow through the buzzer. Supervision in the absence of ringing is provided by a reduced current flow through the buzzer which is not enough to activate the buzzer. Although ordinarily a current flow through the telephone station set in the on-hook condition is generally not desirable, the resulting ability to coincidentally control ringing and supervision signals enables telephone signaling to be accomplished on one signaling pair.

The disclosed telephone set utilizes a low voltage buzzer and a light-emitting diode to replace the standard ringer and incandescent lamp normally used in telephone station sets. Thus, low voltage signaling can be utilized over the signaling pair thereby satisfying recent telephone safety and protection registration requirements.

An additional feature of separating voice and signaling paths to the telephone station set is that visual signaling can be utilized independent of the status of the telephone station set. Thus, visual signaling can occur when the station set is in use. In addition, the criteria for determining the maximum loop length between the telephone controller and station set are more independent since the signaling supply voltages can be changed without affecting the voice communication levels. Finally, the coincident control of supervision and ringing enables automatic simultaneous ring cut-off when the station set goes off-hook. Thus, there is no situation where a telephone user can annoyingly receive extra bursts of ringing after going off-hook.

DETAILED DESCRIPTION

Figure 1:
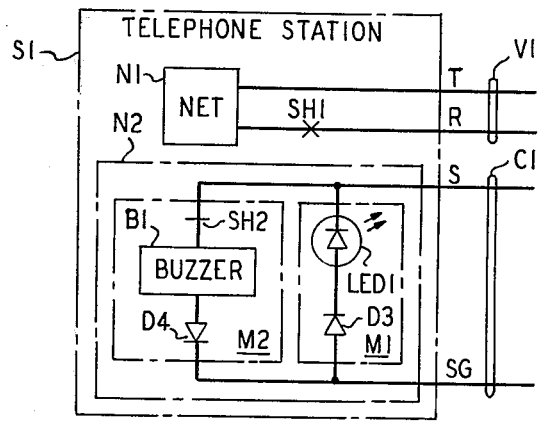
FIG. 1 shows a schematic of a single line telephone station set.
Figure 2:
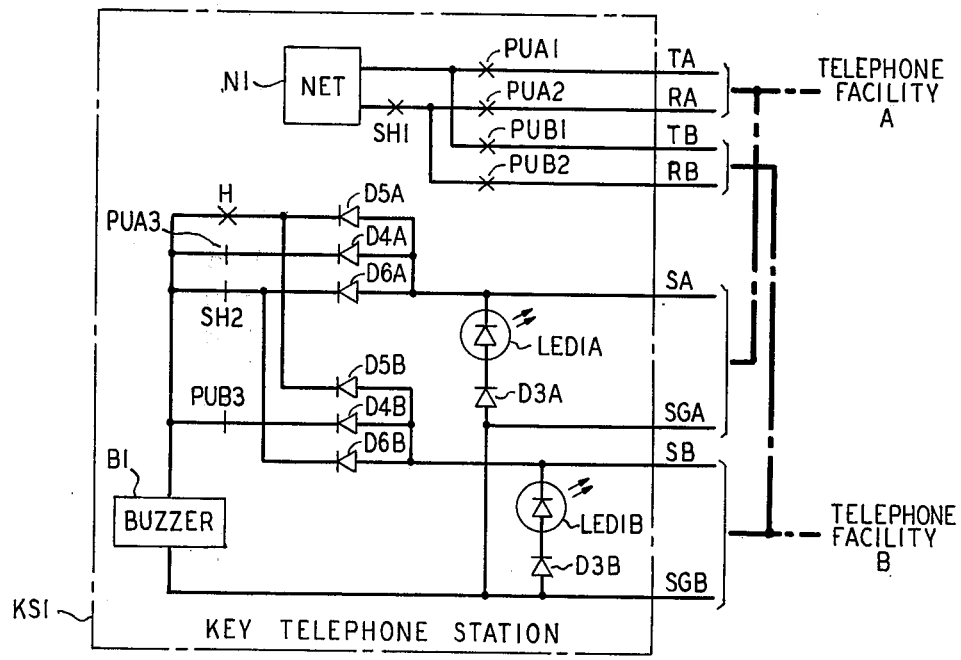
FIG. 2 shows a schematic of a key telephone station set.
Figure 3:
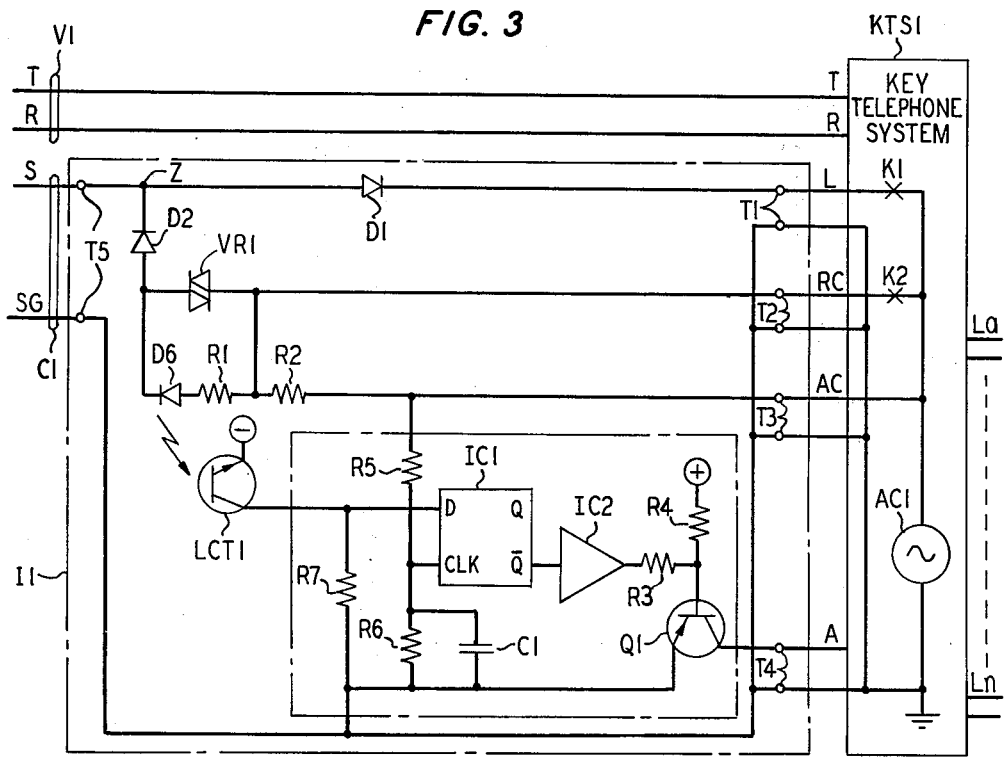
FIG. 3 shows a schematic of an interface circuit for providing the signaling between a key telephone system and the telephone station set.

Considering the drawing in FIG. 1, the telephone station set S1 contains a standard voice communication network N1 connected through switchhook contact SH1 to the T and R leads of communication pair V1. A typical voice communication network is shown in U.S. Pat. No. 2,629,783 issued to H. F. Hopkins on Feb. 24, 1953 (FIG. 2 thereof). Telephone station set S1 includes a signaling network N2 connected across signaling pair C1. Communication pair V1 and signaling pair C1 connect telephone station set S1 to a central office or other telephone switching controller. For example, telephone station set S1 can operate with a key telephone system (telephone controller) utilizing an interface circuit shown in FIG. 3 and described in our previously referenced copending application E. T. Burke-D. F. Jones, Ser. No. 13566 filed concurrently herewith and incorporated by reference herein.

With reference to FIG. 1 signaling network N2 provides telephone station set S1 with switchhook supervision, ringing and visual signaling capability. Visual indicating circuit (M1) is arranged as an illuminating device with LED1 connected in series with diode D3 across leads S and SG of signaling pair C1. In FIG. 1 LED1 is a unidirectional light-emitting diode. Diode D3 and LED1 conduct on negative half-wave signals (when lead S is negative with respect to lead SG). Diode D3 is used to improve the reverse voltage breakdown characteristics of the series path consisting of diode D3 and diode LED1. Audible indicating circuit (M2) is arranged as a series connection of buzzer B1, diode D4 and break switchhook contact SH2 and is also connected across leads S and SG of signaling pair C1. Diode D4 is connected to conduct for positive half-wave signals (when lead S is positive with respect to lead SG). Thus, depending on the polarity of the control signal on pair C1, unidirectional current will flow through either the path containing diode D3 or the path containing diode D4.

Figure 4:
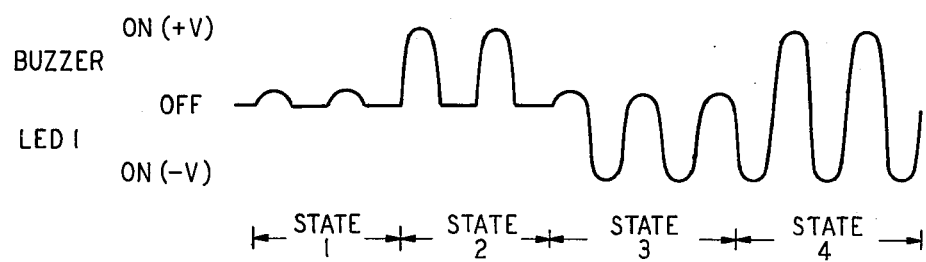
FIG. 4 illustrates the various signaling states.

With reference to FIG. 4 since the visual and ringing signaling states are independent, the voltage on signaling pair C1 could be in one of four states. State 1 would be a small positive half wave signal indicating no visual or ringing signals. Note, a small or large positive half-wave signal on the signaling pair (C1) enables a positive current flow through station set S1. The presence or absence of current flow during the positive half-wave signal in any of the four states determines the respective on-hook and off-hook status of station set S1. State 2 would be a large positive half-wave signal indicating the absence of a visual signal but the presence of a ringing signal (Buzzer B1 "on"). State 3 would be a large negative half-wave signal attenuated with a small positive half-wave signal indicating the absence of a ringing signal but the presence of a visual signal (LED1 "on") Finally, state 4 would be a large alternating voltage signal indicating the presence of visual and ringing signals. It is to be noted, as with conventional telephone signaling, the visual and ringing signals are periodically interrupted to provide the standard ringing and visual sequencing rates. Since the ringing and visual signals are independent the ringing signal existing at state 2 and state 4 (of FIG. 4) is interrupted by either a state 1 or a state 3 signal. Similarly, the visual signal existing at state 3 and state 4 is interrupted by either a state 1 or a state 2 signal.

The embodiment of disclosed telephone station set S1 is not limited to a single line station set but can be implemented in well known key telephone station set arrangements. Shown in FIG. 2 is a key telephone station set KS1 for handling two telephone lines. Key station set KS1 can be implemented from a standard 500 type key telephone station set by replacing the ringer and lamps with a buzzer (B1) and LEDs (LED1A, LED1B) plus the addition of diodes D3A-D6A, D3B-D6B. Rewiring of the components and contacts as shown in FIG. 2 will complete the modifications required to implement the disclosed key station set from a 500 type key telephone set.

Communication pair TA, RA and signaling pair SA, SGA are associated with one telephone line A while communication pair TB, RB and signaling pair SB, SGB are associated with a second telephone line B. As with conventional key telephone sets pick-up keys (PUA, PUB) having contacts (PUA1-3, PUB1-3) are associated with each telephone facility (A,B). These pick-up keys switch access of each facility (A,B) to the common voice communication network N1 and buzzer B1.

Diodes D4A, D4B are inserted in series with break pick-up contacts PUA3, PUB3 to prevent coupling the positive ringing or supervision currents from line SA to line SB and vice versa. Likewise, break switchhook contact SH2 and make hold contact H are wired with diodes D6A, D6B and D5A, D5B respectively to prevent coupling of the positive currents from line SA to line SB and vice versa.

The resulting switchhook supervision of key telephone station set KS1 is indentical to A lead signaling of a standard 500 type key telephone station set except that station set KS1 detects the on-hook condition by the presence of current whereas the standard key set detects the on-hook condition by the absence of current flow. Thus, in the standard key station set an off-hook and a line pick-up operation are required for A lead current flow, whereas an off-hook and a line pick-up operation are required to interrupt current in the disclosed key station set KS1. Additionally, pressing the hold key interrupts A lead current in the standard key station set, whereas it would reinitiate supervision current in the disclosed key station set KS1. As with A lead signaling in the standard key station set the on-hook and hold mode signaling needs to be distinguished by the connected telephone controller. Thus, the switchhook supervision current of the disclosed key telephone station set KS1 functions identical to A lead operation of standard key station sets.

Since the switchhook supervision currents from both line SA and SB will flow through buzzer B1 they must be selected so that the resulting current flow will not operate buzzer B1. Otherwise, the signaling operation of key telephone station set KS1 of FIG. 2 is identical to the operation of telephone station set S1 shown in FIG. 1.

If key telephone station set KS1 is located nearby, the telephone controller lines SA, SGA and SB, SGB may be short enough such that a common ground could be utilized. Thus, either lead SGA or SGB could be eliminated. In these situations, depending on the current flow requirements, a key telephone station set KS1 could require n+1 signaling wires to provide signaling to n telephone lines.

Although specific embodiments of the disclosed telephone have been disclosed, other embodiments known to those skilled in the art could provide the same function without deviating from the scope of the disclosed invention.

We claim:

1. A telephone station set (S1) arranged to communicate voice, control and status signaling over a two pair facility to a connected telephone system characterized in that said telephone station set (S1) includes
    a communication network means (N1) for providing dialing and voice communications to said telephone system over a voice communication pair (V1) of said two pair facility, and
    a signaling network means (N2) arranged for providing supervisory analog voltage signaling and for responding to existing analog voltage ringing and visual signaling voltages from said telephone system over a signaling pair (C1) of said two pair facility.

2. The invention of claim 1 wherein said signaling network means (N2) of said telephone station set (S1) includes
    means for visually indicating (M1) when a first polarity of voltage exists across said signaling pair (C1), and
    means for audibly indicating (M2) when a second polarity of voltage exists across said signaling pair.

3. The invention of claim 2 wherein said visual indicating means (M1) includes a unidirectional light emitting diode (LED1).

4. The invention of claim 2 wherein said audible indicating means (M2) conducts current but is inoperative for a reduced amplitude of said second polarity of voltage across said signaling pair.

5. The invention of claim 4 wherein said current flowing through said audible indicating means (M2) provides a supervision current which is interrupted when said station set goes off-hook.

6. The invention of claim 5 wherein said audible indicating means (M2) includes a unidirectional buzzer means (B1, D1) in series with a break switchhook contact (SH2).

7. A telephone station set (S1) arranged to communicate with a connected telephone system over a first wire pair (V1) for communicating voice and dialing signals and a second wire pair (C1) for communicating a first analog voltage signal for powering a visual device (LED1) and a second analog voltage signal for powering an audible device (B1) in telephone wherein said first and second signals are derived from existing signals at said telephone system and wherein switchhook signaling is derived from interrupting a supervision current flow on said second wire pair.

8. The invention of claim 7 wherein said first signal is a first half-wave polarity of an alternating voltage and said second signal is a second half-wave polarity of an alternating voltage.

9. The invention of claim 8 wherein said second signal provides said supervision current.

10. The invention of claim 7 wherein said supervision current flows through said audible device (B1) of said station set (S1) without operating said audible device.

11. The invention of claim 7 wherein a break switchhook contact (SH2) of said station set (S1) interrupts said supervision current.

* * * * *